US009317064B2

(12) United States Patent
Wu et al.

(10) Patent No.: US 9,317,064 B2
(45) Date of Patent: Apr. 19, 2016

(54) ELECTRONIC DEVICE

(71) Applicant: GIGA-BYTE TECHNOLOGY CO., LTD., New Taipei (TW)

(72) Inventors: Chung Hsin Wu, New Taipei (TW); Shu Mu Lin, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 104 days.

(21) Appl. No.: 13/886,174

(22) Filed: May 2, 2013

(65) Prior Publication Data

US 2014/0133095 A1 May 15, 2014

(30) Foreign Application Priority Data

Nov. 15, 2012 (TW) .............................. 101142687 A

(51) Int. Cl.
*H05K 5/00* (2006.01)
*H05K 7/20* (2006.01)
*G06F 1/16* (2006.01)
*G06F 1/20* (2006.01)

(52) U.S. Cl.
CPC ............ *G06F 1/1616* (2013.01); *G06F 1/1681* (2013.01); *G06F 1/203* (2013.01)

(58) Field of Classification Search
CPC ............ H05K 7/20127; H05K 9/0039; H05K 1/0215; H01L 23/467; G06F 1/20; G06F 1/184; H04M 1/0216
USPC ............... 361/752, 754–755, 679.01–679.09, 361/679.27–679.28, 679.51, 679.49–679.5, 361/679.06
See application file for complete search history.

(56) References Cited

U.S. PATENT DOCUMENTS

| 4,624,433 | A  | * | 11/1986 | Henneberg | ............... | 248/346.06 |
| 6,067,224 | A  | * | 5/2000  | Nobuchi   | .................. | 361/679.27 |
| 6,243,260 | B1 | * | 6/2001  | Lundgren et al. | ........ | 361/679.23 |
| 6,781,819 | B2 | * | 8/2004  | Yang et al. | ............... | 361/679.09 |
| 2002/0012228 | A1 | * | 1/2002  | Ozaki et al. | .................... | 361/687 |
| 2006/0243878 | A1 | * | 11/2006 | Saad | ........................ | 248/346.01 |
| 2008/0316692 | A1 | * | 12/2008 | Jacobs et al. | .................. | 361/683 |
| 2009/0147469 | A1 | * | 6/2009  | Chen et al. | ............... | 361/679.55 |
| 2010/0214743 | A1 | * | 8/2010  | Huang et al. | .................. | 361/692 |
| 2010/0246106 | A1 | * | 9/2010  | Chiu | ........................ | 361/679.01 |

(Continued)

FOREIGN PATENT DOCUMENTS

| TW | M385909 | U1 | 8/2010 |
| TW | M396901 | U1 | 1/2011 |

(Continued)

*Primary Examiner* — Eric Thomas
*Assistant Examiner* — Arun Ramaswamy
(74) *Attorney, Agent, or Firm* — Chun-Ming Shih

(57) ABSTRACT

An electronic device includes a first body, a second body, a baffle, and a drive mechanism. The second body includes an opening on a bottom surface thereof, and the baffle is disposed on the bottom surface to cover the opening. The baffle is pivotally connected to the second body to rotate with respect to the second body. The drive mechanism includes a pivot, a linkage and a cam. The pivot connects the first body and the second body. The linkage is sleeved over the pivot. The cam is sleeved over the linkage and located corresponding to the baffle. While the first body rotates with respect to the second body, the pivot rotates with the first body and drives the linkage to make the cam rotate. Meanwhile, the cam pushes the baffle and makes the baffle rotate and expose part of the opening to enhance cooling effect of the electronic device.

6 Claims, 15 Drawing Sheets

(56) References Cited

U.S. PATENT DOCUMENTS

| | | | |
|---|---|---|---|
| 2011/0026195 A1* | 2/2011 | Lin | 361/679.01 |
| 2011/0075352 A1* | 3/2011 | Tye et al. | 361/679.46 |
| 2011/0133619 A1* | 6/2011 | Ma et al. | 312/326 |
| 2011/0235275 A1* | 9/2011 | Su et al. | 361/692 |
| 2011/0235847 A1* | 9/2011 | Bhutani et al. | 381/395 |
| 2011/0304983 A1* | 12/2011 | Senatori | 361/679.55 |
| 2012/0127652 A1* | 5/2012 | Lin et al. | 361/679.46 |
| 2013/0114205 A1* | 5/2013 | Huang | 361/679.49 |

FOREIGN PATENT DOCUMENTS

| TW | M434967 U1 | 8/2012 |
|---|---|---|
| TW | M436266 U1 | 8/2012 |

\* cited by examiner

ELECTRONIC DEVICE

CROSS-REFERENCES TO RELATED APPLICATIONS

This non-provisional application claims priority under 35 U.S.C. §119(a) on Patent Application No. 101142687 filed in Taiwan, R.O.C. on 2012 Nov. 15, the entire contents of which are hereby incorporated by reference.

BACKGROUND

1. Technical Field

This disclosure relates to an electrical device, and more particularly to an electrical device which can move a baffle to expose an opening for enhancing cooling effect for the electronic device.

2. Related Art

Nowadays, the portable electronic products, such as laptop computers, tablet PCs, ultra mobile personal computers, etc, have gradually developed toward miniaturization. The compactness brings advantage of easy carrying and enhances the convenience of usage.

However, the compactness also brings some disadvantages. With limited available internal spaces, some portable electronic devices are not equipped with fans or other enhancing means for cooling inside. There are many electronic components, such as CPUs, graphics cards, etc., inside the devices. These electronic components generate lots of heat while operating. Take a notebook as an illustration, when the notebook works under high temperature environment with the bottom surface placed on the table, the heat the notebook will not be exhausted in time, and high internal temperature with damage the notebook. Therefore, cooling is an important issue to a compact electronic device.

To solve the cooling issue inside the portable electronic device, the current approach is to set up heat exhausting holes on the bottom surface of the portable electronic device, so as to exhaust heat generated by the electronic components through these heat exhausting holes. A gap between the bottom and the table is required for these heat exhausting holes, therefore pads have to be set up on the bottom of the electronic device to raise the electronic device to keep the aforementioned gap.

Considering the appearance of the electronic device, heat exhausting holes often set up on the bottom of the electronic device, or the number and area of the holes are limited. However, the current portable electronic devices have pretty high work performance, and generate a lot of heat. Relying only on heat exhausting holes to exhaust the heat is insufficient to drop the operating temperature of the electronic device, so this way can not fulfill the cooling needs of high performance laptops.

SUMMARY OF THIS DISCLOSURE

In view of the above problems, this disclosure provides an electronic device to solve the cooling issue of the current portable electronic devices.

The electronic device of this disclosure includes a motherboard disposed therein, wherein the motherboard is used to execute the default functions of the electronic device. The electronic device includes a first body, a second body, a baffle, and a drive mechanism. The second body is pivotally connected to the first body and has an opening on one side thereof. The baffle is disposed on the side surface with the opening of the second body. One side edge of the baffle is pivotally connected to the second body, and the baffle is able to rotate with respect to the second body. The drive mechanism includes a pivot, a linkage, and a cam. Two ends of the pivot are respectively connected the first body and the second body. The linkage is sleeved over the pivot. The cam is sleeved over the linkage and disposed at a position corresponding to that of the baffle.

When the first body rotates with respect to the second body, the first body drives the pivot to rotate, and the pivot drives the linkage to make the cam rotate. Meanwhile, the cam pushes or pulls the baffle and makes the baffle rotate with respect to the second body and cover or expose part of the opening.

When the first body is opened and the electronic device operates, the first body also drives the baffle to rotate and to expose at least part of the opening on the bottom surface, so as to increase the cooling space under the electronic devices and enhance the internal airflow circulating. Therefore, the heat dissipating efficiency is enhanced while the compactness requirement of portable electronic devices is simultaneously satisfied.

These and other objects and advantages of this disclosure can be better appreciated from the following detailed description of this disclosure, taken in conjunction with the attached drawings.

BRIEF DESCRIPTION OF THE DRAWINGS

This disclosure will become more fully understood from the detailed description given herein below for illustration only, and thus not limitative of this disclosure, wherein.

DETAILED DESCRIPTION OF THIS DISCLOSURE

Figure 1:
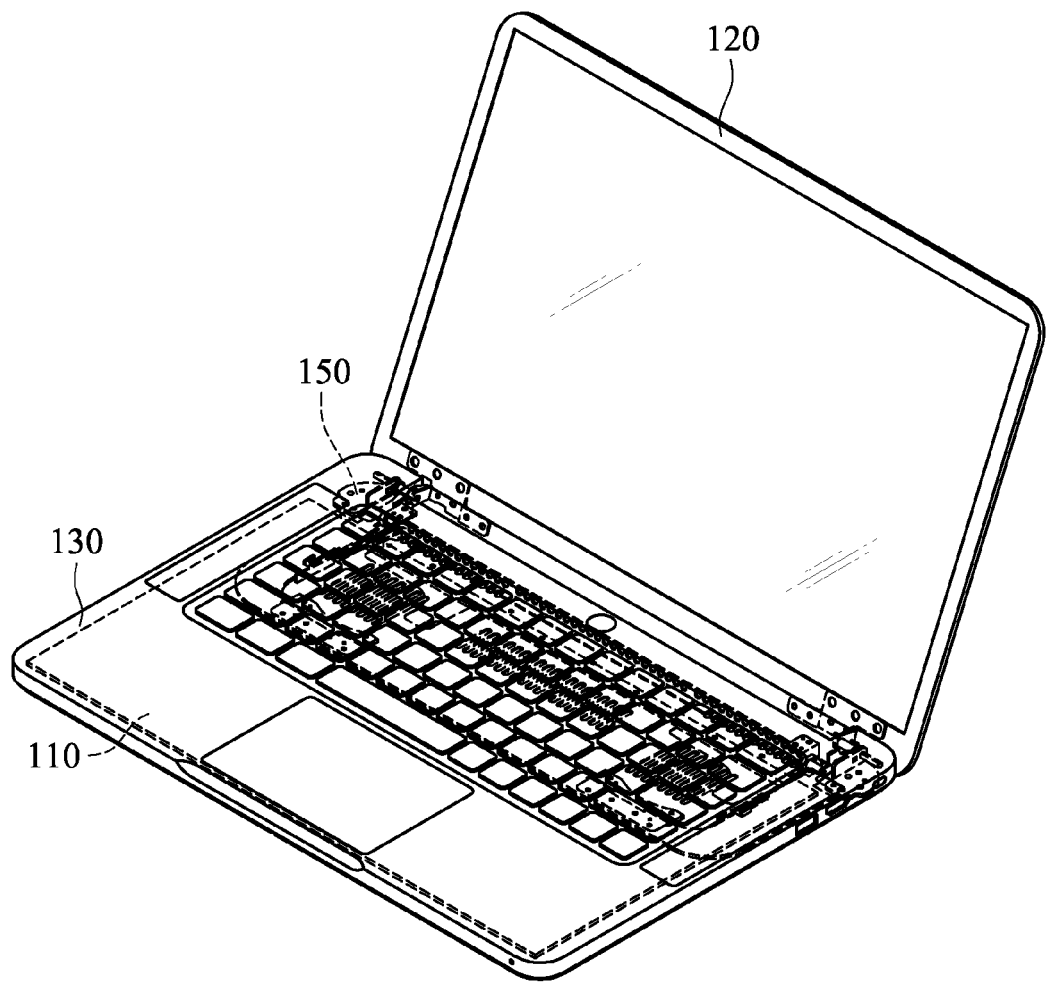
FIG. 1 is a perspective view of the electronic device according to a first embodiment.
Figure 2A:
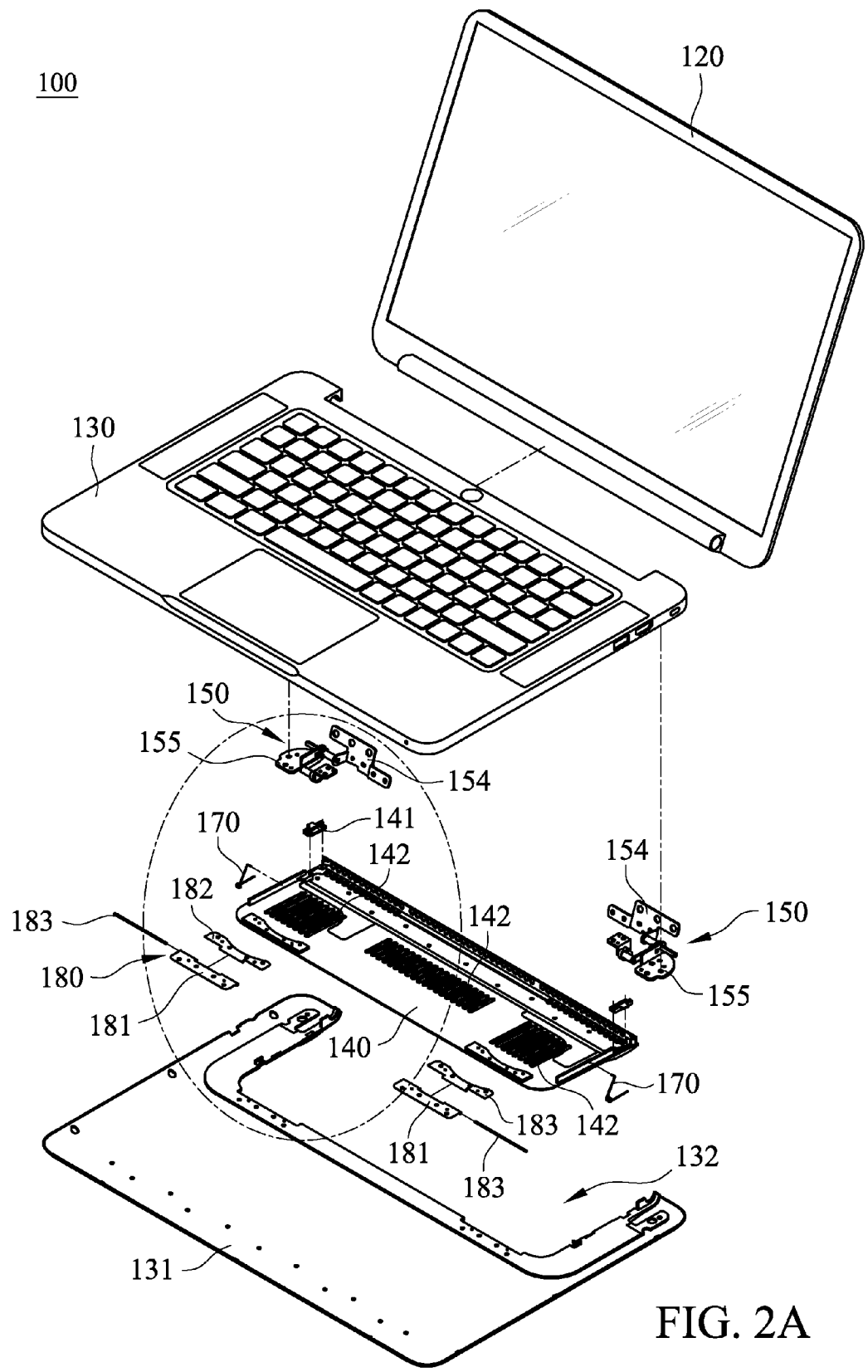
FIG. 2A is an exploded view of the electronic device according to the first embodiment.
Figure 2B:
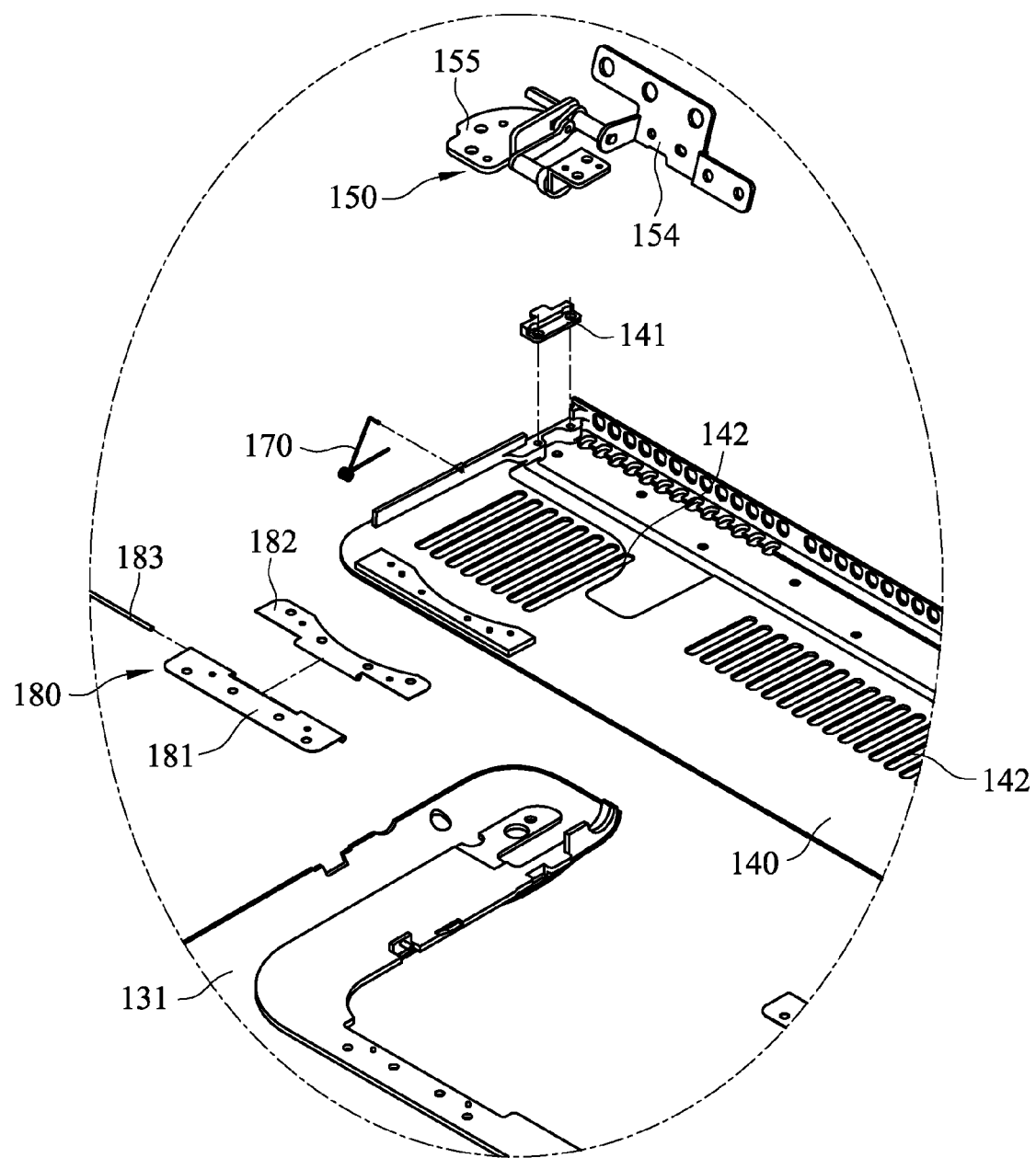
FIG. 2B is a partial exploded view of the electronic device according to the first embodiment.
Figure 2C:
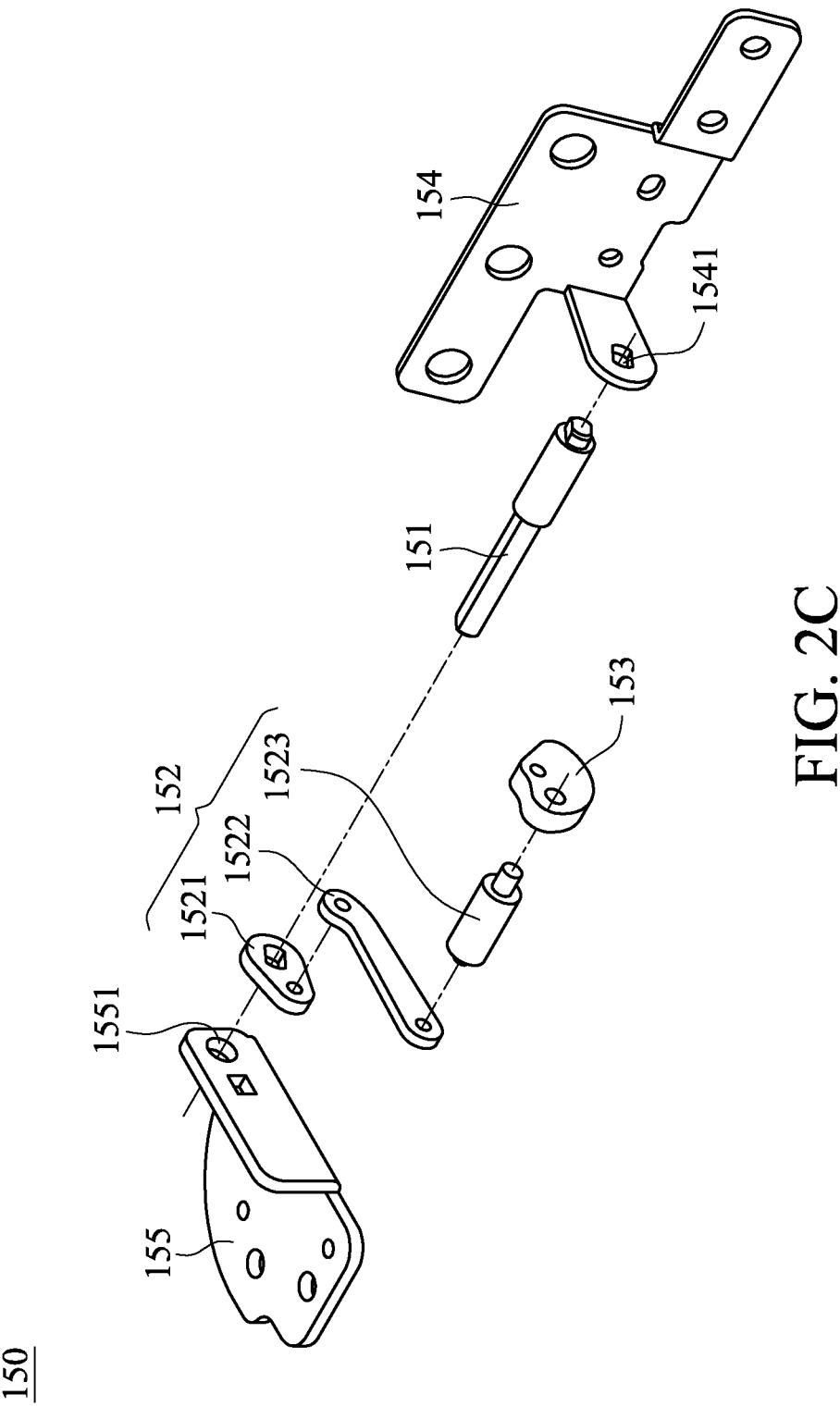
FIG. 2C is an exploded view of the driving mechanism according to the first embodiment.
Figure 3A:
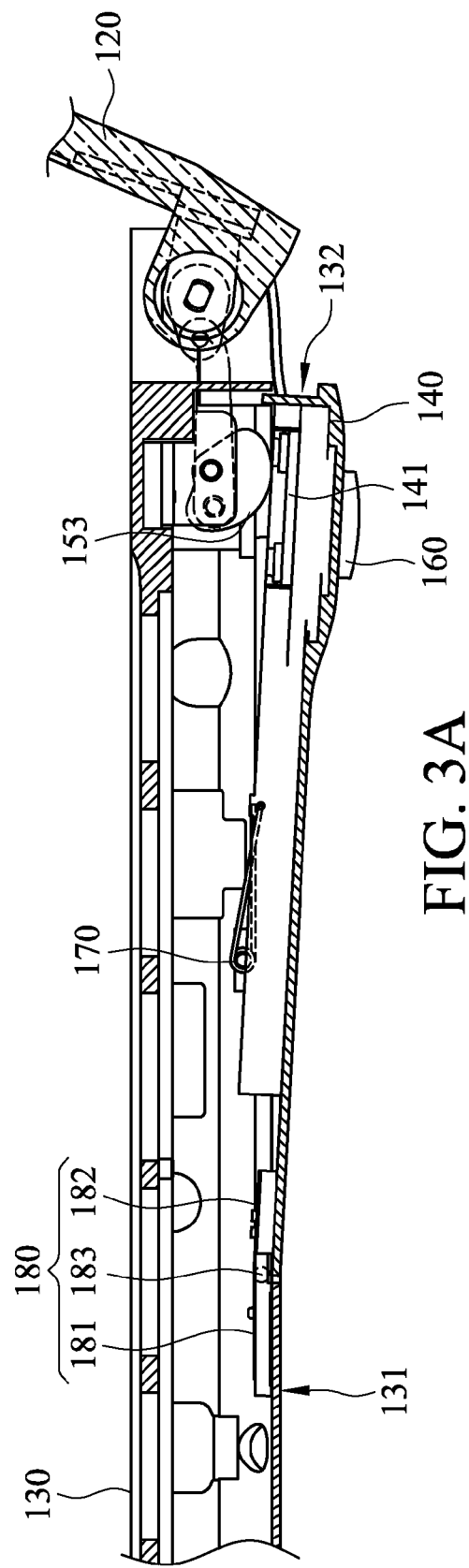
FIG. 3A is a cross-sectional view of the electronic device according to the first embodiment while the first body is in the opened position.
Figure 3B:
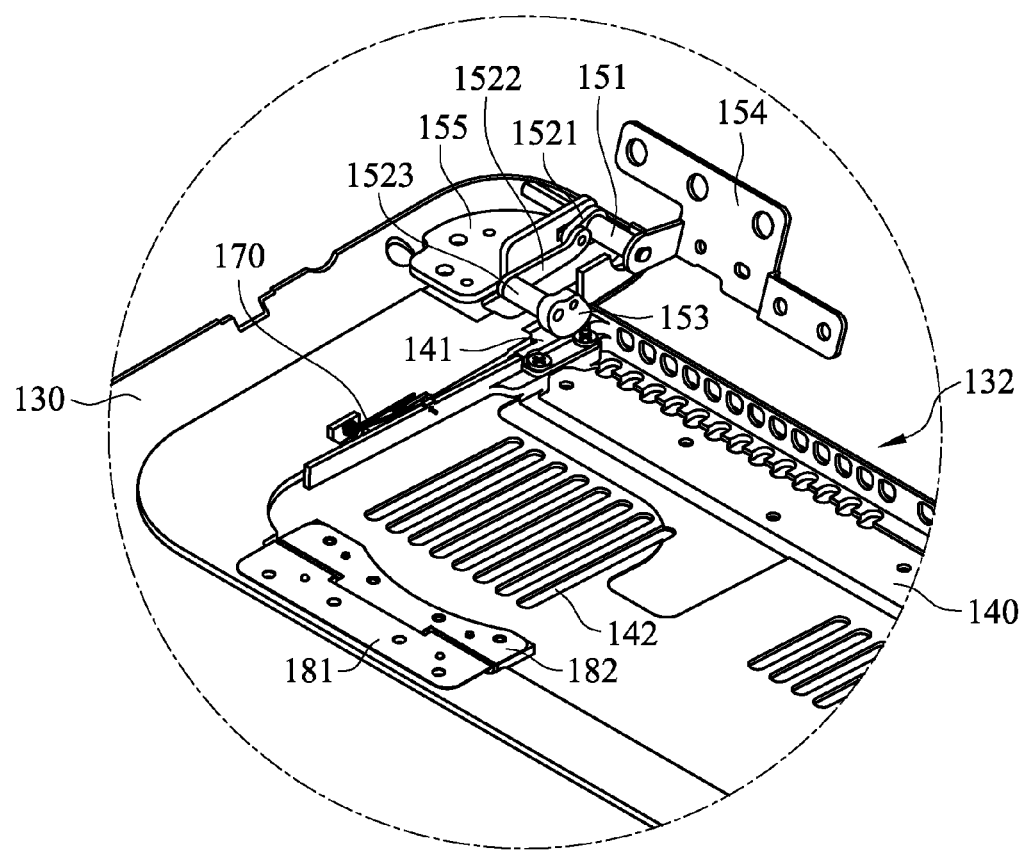
FIG. 3B is a partial enlarged view of the electronic device according to the first embodiment while the first body is in the opened position.
Figure 3C:
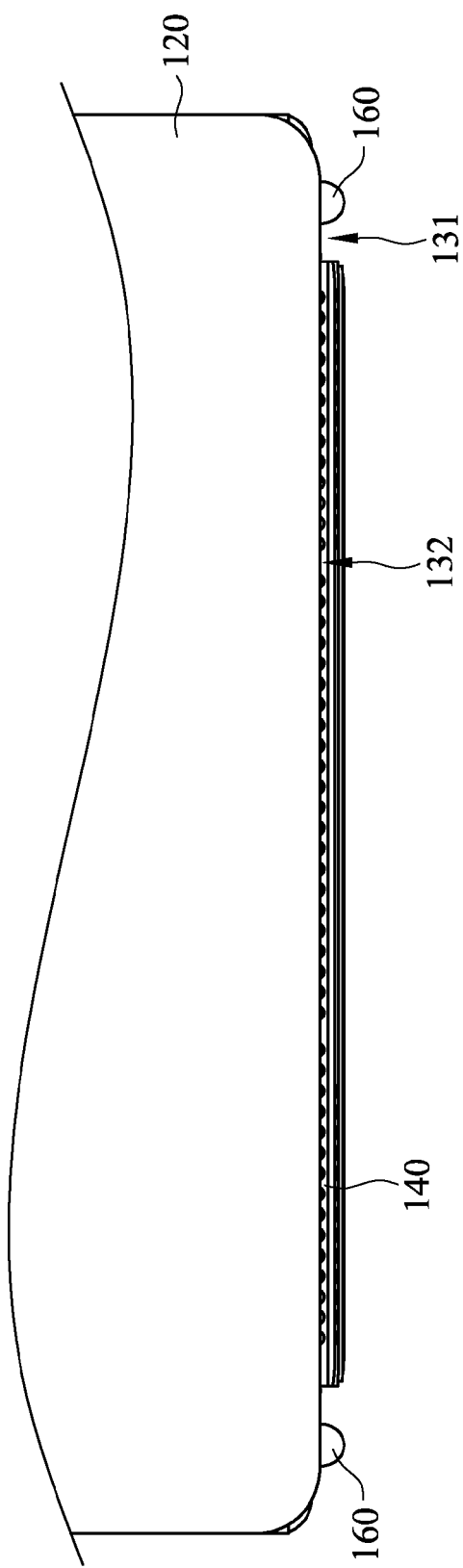
FIG. 3C is a rear view of the electronic device according to the first embodiment while the first body is in the opened position.
Figure 4A:
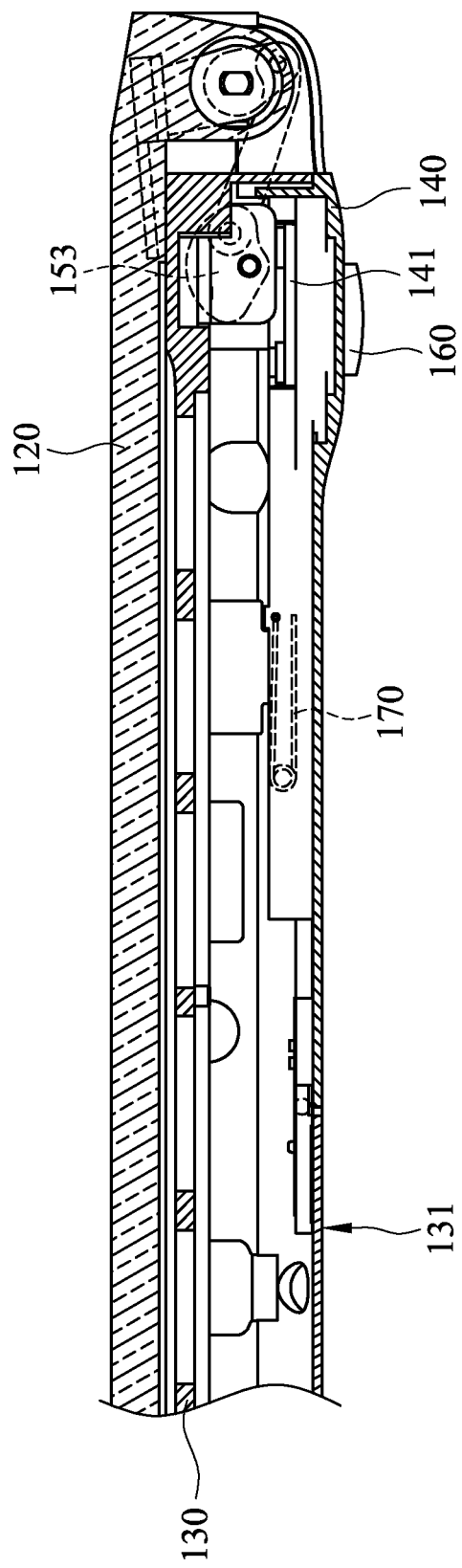
FIG. 4A is a cross-sectional view of the electronic device according to the first embodiment while the first body leaves the opened position.
Figure 4B:
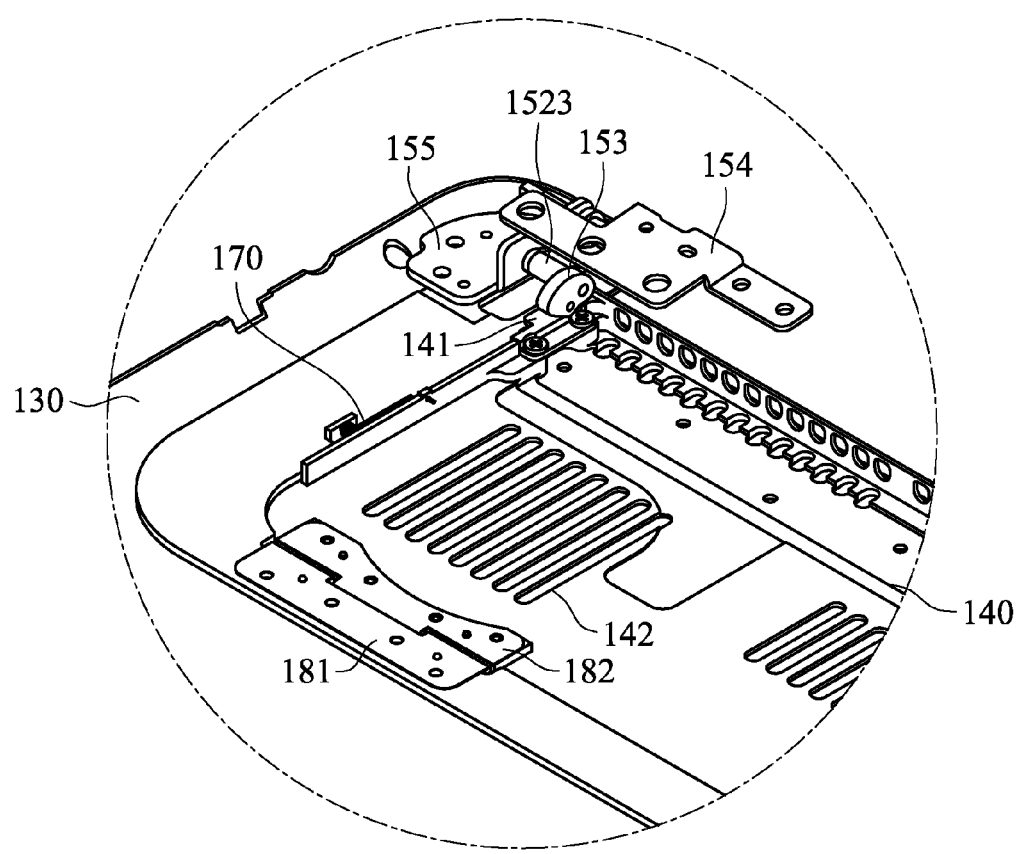
FIG. 4B is a partial enlarged view of the electronic device according to the first embodiment while the first body leaves the opened position.
Figure 4C:
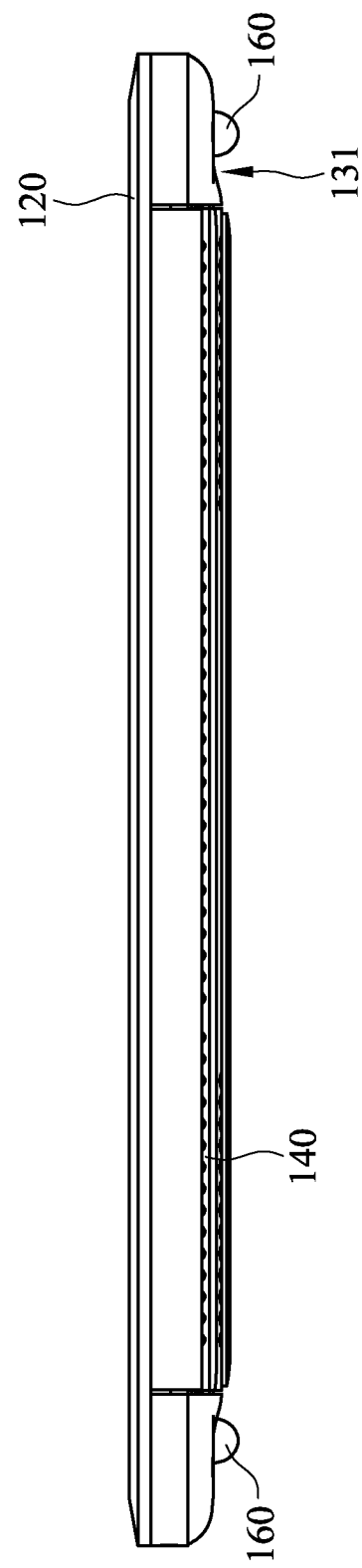
FIG. 4C is a rear view of the electronic device according to the first embodiment while the first body leaves the opened position.
Figure 5:
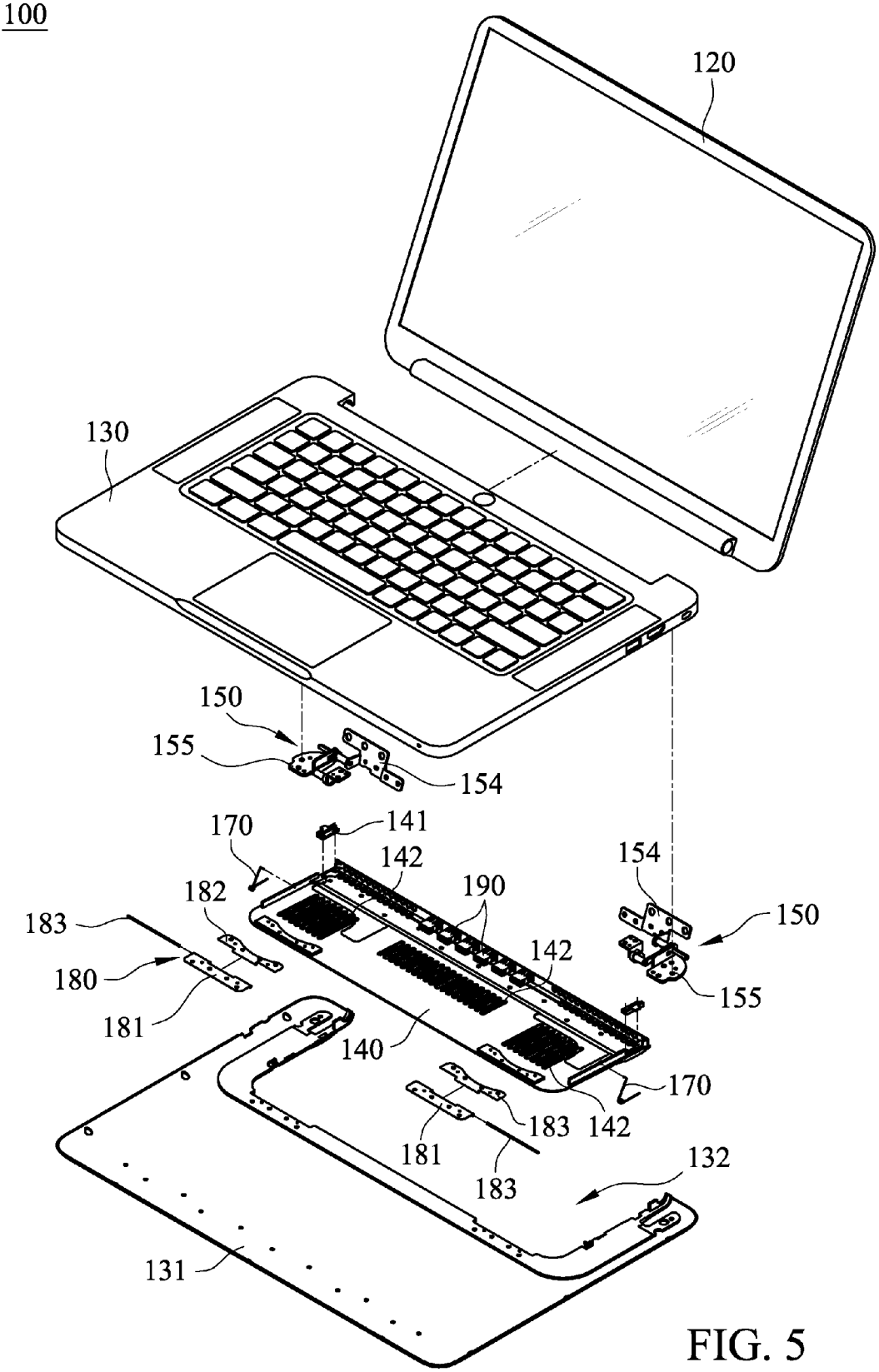
FIG. 5 is an exploded view of the electronic device according to a second embodiment.

Refer to FIG. 1, FIG. 2A, FIG. 2B, and FIG. 2C, an electronic device 100 according to the first embodiment of this disclosure is equipped with a motherboard 110 disposed inside the electronic device 100. The motherboard 110 is electrically configured with a plurality of electronic components to execute default functions of the electronic device 100. It is noted that the electrical device 100 described in this disclosure is but not limited to a desktop computer, a laptop computer, or any electronic device that can be connected to computer peripheral devices. The following detailed description of this disclosure will use a laptop computer as an illustration. The attached drawings are for reference and description purposes only, not to limit this disclosure.

Refer to FIG. 1, FIG. 2A, FIG. 2B, and FIG. 2C, the electronic device 100 includes a first body 120, a second body 130, a baffle 140, and a drive mechanism 150. In the present embodiment, the first body 120 is a display of the electronic device 100 and the second body 130 is a host body of the electronic device 100. The motherboard 110 is disposed in the second body 130. The first body 120 is pivotally connected to the second body 130, and the detailed connecting mechanism will be described later. The bottom surface 131 of the second body 130 has an opening 132 disposed near the edge of the bottom surface 131 of the second body 130. The interior of the second body 130 communicates the outside through the opening 132. It is noted that the opening 132 could also choose to set up on the other side of the second body 130, not limited as described herein.

In addition, the bottom surface 131 of the second body 130 further has a plurality of pads 160 respectively disposed on the respective corners of the second body 130, so that the second body 130 is raised to a certain height for use convenience when placed on a plane.

The baffle 140 is disposed on the bottom surface 131 of the second body 130, and the size of the baffle 140 matches or is large than that of the opening 132, so that the baffle 140 can cover the opening 132. The electronic device 100 includes a pivotal rotation mechanism 180. The pivotal rotation mechanism 180 includes a first connecting piece 181, a second connecting piece 182, and a shaft 183. The first connecting piece 181 is fixed to the bottom surface 131 of the second body 130 and near the position of the opening 132, the second connecting piece 182 is fixed to one side edge of the baffle 140, and the first connecting piece 181 and the second connecting piece 182 are pivotally connected with each other via the shaft 183, such that the first connecting piece 181 and the second connecting piece 182 are able to rotate with respect to each other. The baffle 140 is connected to the second body 130 via the pivotal rotation mechanism 180, and the baffle 140 is able to rotate with respect to the second body 130 via the pivotal rotation mechanism 180 and exposes part of the opening 132.

The electronic device 100 further includes an elastic element 170. In the present embodiment, the elastic element 170 is a tension spring. One end of the elastic element 170 is connected to the baffle 140, and the other end of the elastic element 170 is connected to the second body 130. The elastic element 170 can provide a return tension force to the baffle 140, making the baffle 140 stay in the position that covers the opening 132.

As are shown in FIG. 1, FIG. 2A, FIG. 2B, and FIG. 2C, the drive mechanism 150 includes a pivot 151, a linkage 152, a cam 153, a first fixing board 154, and a second fixing board 155. The first fixing board 154 is fixed to the first body 120, and the second fixing board 155 is fixed to the second body 130. The first fixing board 154 has a first aperture 1541, and the second fixing board 155 has a second aperture 1551. Two ends of the pivot 151 respectively run through the first aperture 1541 and the second aperture 1551, so as to pivotally connect the first body 120 to the second body 130. Therefore, the first body 120 can rotate with respect to the second body 130 to the opened position or the closed position.

The linkage 152 includes a first linkage element 1521, a second linkage element 1522, and a third linkage element 1523. The first linkage element 1521 is sleeved over the pivot 151. One end of the second linkage element 1522 is pivotally connected to the first linkage element 1521, and the other end of the second linkage element 1522 is pivotally connected to the third linkage element 1523, and the third linkage element 1523 is mutually sleeved over the cam 153. The cam 153 is disposed corresponding to the position of the baffle 140. The action of the pivot 151 and the linkage 152 of the drive mechanism 150 can drive the cam 153 to rotate.

Although the linkage 152 is consist of three linkage elements in this embodiment, people having ordinary skill in the art can make proper modification to the configuration of the linkage elements according to the actual design requirement, not limited to the present embodiment.

Refer to FIG. 2A, FIG. 2B, FIG. 3A, FIG. 3B, and FIG. 3C, when the first body 120 rotates with respect to the second body 130 to the opened position, the pivot 151 connecting the first body 120 are driven to rotate as well, and the pivot 151 drives the linkage 152 to make the cam 153 rotate as well. In the meantime, the cam 153 pushes the baffle 140 via the protruding end thereof, such that the baffle 140 rotates via the end thereof pivotally connected to the second body 130. As a result, the other end of the baffle swings outwardly, and part of the opening 132 is exposed. In this way, the cooling space of the electronic device 100 increases, boosting the airflow between the interior and external of the electronic device 100. The baffle 140 of the present embodiment has a plurality of heat exhausting holes 142, enhancing the cooling performance of the electrical device 100.

The baffle 140 further includes a stopper 141. The stopper 141 is disposed on the edge of the baffle 140, and the relative position of the stopper 141 corresponds to that of the second body 130. When the baffle 140 swings outwardly to a certain angle, the stopper 141 withstands the bottom surface 131 of the second body 130, such that the baffle 140 rotates in a limited range of angle and that bigger dust or dirt could not enter the interior of the second body 130 via the opening 132.

The maximum rotation angle of the baffle 140 is limited by the stopper 141, and the maximum distance between baffle 140 and the bottom surface 131 of the second body 130 after the baffle 140 rotates is shorter than the height of the pads 160, such that the baffle 140 will not interferes the second body 130 while in use, that is, the electronic device 100 will stay fixed when placed on a plane without being influenced by the baffle 140.

It is noted that this disclosure does not limit the rotation angle of the baffle 140. People having ordinary skill in the art can make proper modification to adjust the maximum rotation angle of the baffle according to actual conditions. The maximum displacement distance of the baffle 140 after the baffle rotates can even be larger than the height of the pads 160, not limited to the embodiments of this disclosure herein.

Refer to FIG. 2A, FIG. 2B, FIG. 4A, FIG. 4B, and FIG. 4C, when the first body 120 rotates with respect to the second body 130 and leaves the opened position, for example, the first body 120 rotates to the closed position when electronic device 100 is not in use, the pivot 151 connecting the first body 120 are driven to rotate as well, and the pivot 151 drives the linkage 152 to make the cam 153 rotate as well. In the meantime, the cam 153 separates from the baffle 140, so that the cam 153 does not apply a pushing force to the baffle 140. And the elastic element 170 respectively connecting to the second body 130 and the baffle 140 provides restoring pull force. From the stretched state back to the initial state, the elastic elements 170 pull the baffle 140 back to the position to cover the opening 132, and appearance of second body 130 remains integrally.

Refer to FIG. 5 to FIG. 7B, the structure of the electronic device 100 of the second embodiment is similar to that of the first embodiment. The difference lies in that the electronic device 100 of the second embodiment further includes an electronic port 190. The electronic port 190 can be but not limited to HDMI port, USB port, and network adapter port. The electronic port 190 is disposed on the side surface, facing the interior of the second body 130, of the baffle 140. The electronic port 190 electronically connects with motherboard 110 by flexible electronic connecting elements such as flexible cables or a flexible circuit board.

Figure 6A:
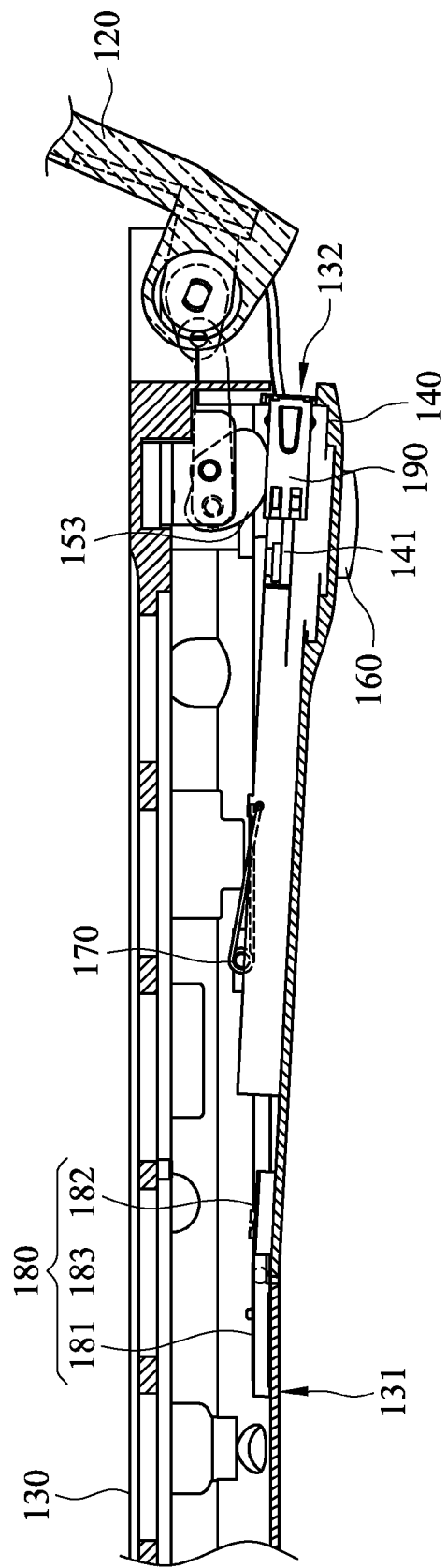
FIG. 6A is a cross-sectional view of the electronic device according to the second embodiment while the first body is in the opened position.
Figure 6B:
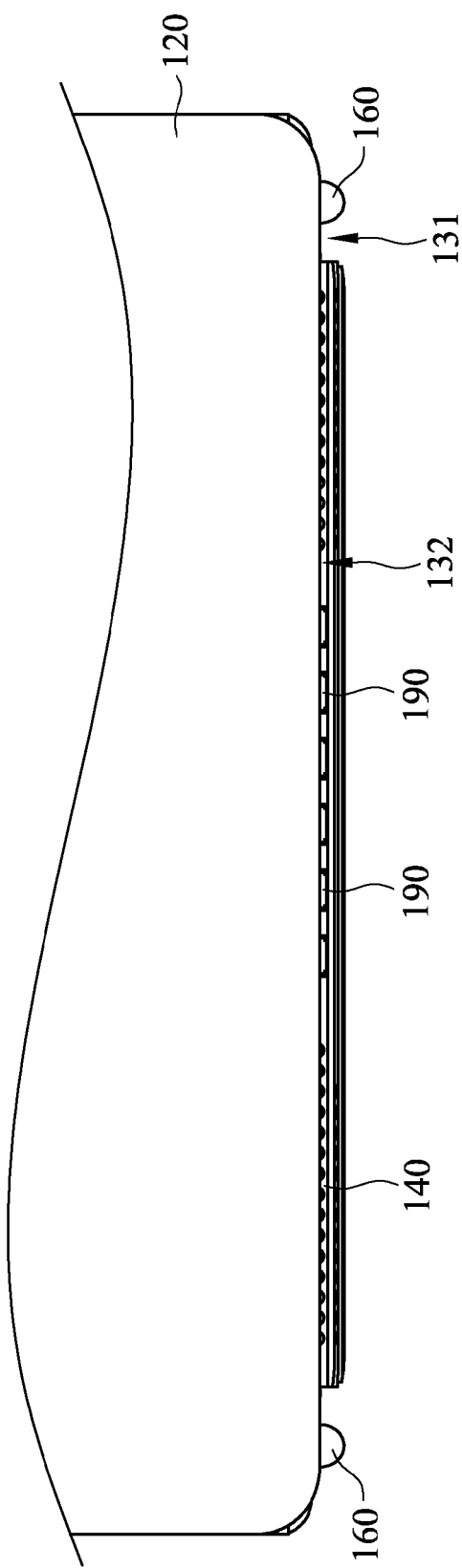
FIG. 6B is a rear view of the electronic device according to the second embodiment while the first body is in the opened position.

As shown in FIG. 6A and FIG. 6B, when the baffle 140 moves with respect to the second body 130 and exposes part of the opening 132, the electronic port 190 will be exposed through the opening 132 with the movement of the baffle 140. And the computer peripheral devices (not shown in the figures) can electronically connect electronic device 100 through the electronic port 190. The electronic port 190 of the embodiment can be completely exposed by the exposure of the opening 132, such that users can electronically insert the electronic connections of the computer peripheral devices into the electronic port 190.

Figure 7A:
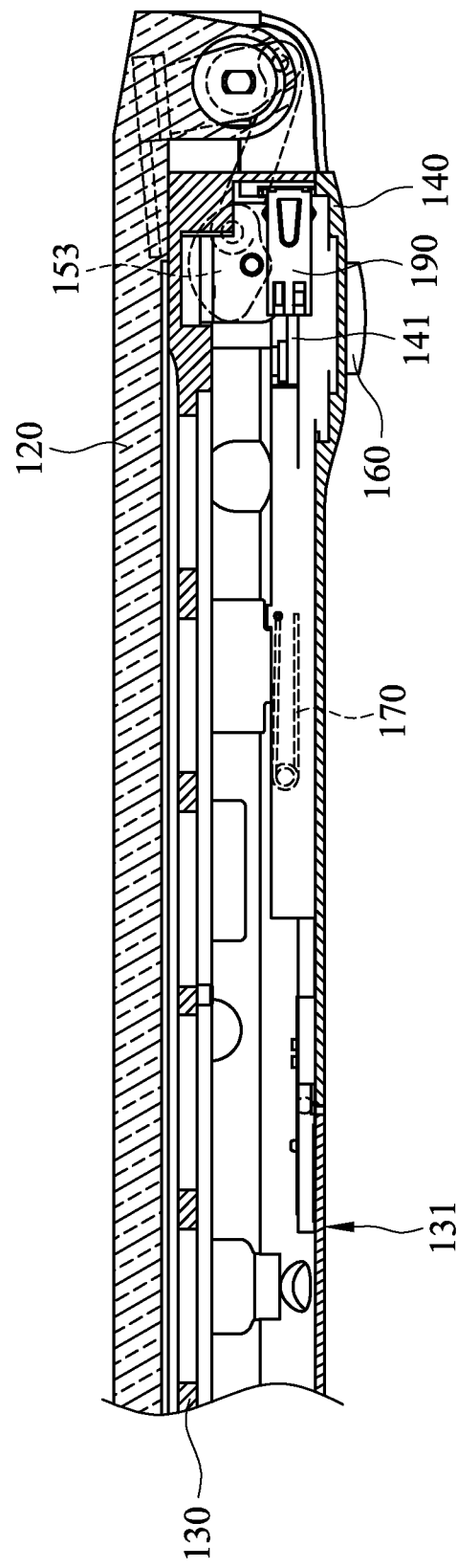
FIG. 7A is a cross-sectional view of the electronic device according to the second embodiment while the first body leaves the opened position.
Figure 7B:
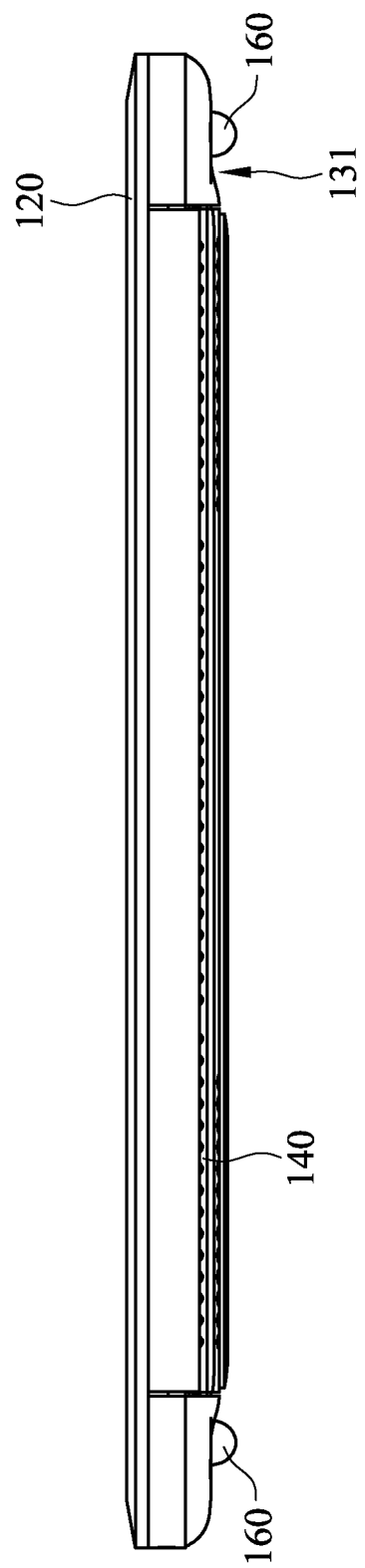
FIG. 7B is a rear view of the electronic device according to the second embodiment while the first body leaves the opened position.

As shown in FIG. 7A and FIG. 7B, when the first body 120 rotates with respect to the second body 130 and leaves the opened position, the baffle 140 will be pulled by the elastic element 170 and cover the opening 132. In the meantime, the electronic port 190 will move into the interior of the second body 130, making the appearance of the second body 130 remains integrally.

The following table shows the measurement of the operating temperatures of main electronic components of the electronic device of the prior art and this disclosure:

|  | The electronic device in the art | The electronic device of this disclosure |
| --- | --- | --- |
| System environment | 26.3° C. | 26.5° C. |
| Center processor unit | 99.0° C. | 84.0° C. |
| Graphics processing unit | 94.0° C. | 82.0° C. |
| Platform controller hub | 90.0° C. | 83.0° C. |

From the above table, we can clearly know that when the electronic device 100 of this disclosure is in use, by driving the drive mechanism 150 to push the baffle 140 to expose part of the opening 132, the electronic device 100 is efficiently cooled to lower overall operating temperature of the electronic device 100. The drive mechanism 150 and baffle 140 of this disclosure do not occupy extra internal space of the electronic device 100. Therefore, the electronic device 100 of this disclosure has both high cooling performance and compact feature.

Though the embodiments of this disclosure are disclosed as described above, this is not to limit this disclosure. Those skilled in the art will recognize that this disclosure can be practiced with modification within the spirit and scope of the claim. It is therefore to be understood that this disclosure is not to be limited by the foregoing description but only by the appended claims.

What is claimed is:

1. An electronic device to process default functions of the electronic device, comprising:
    a first body;
    a second body, pivotally connected to the first body, wherein the second body includes an opening on a bottom surface of the second body;
    a motherboard, disposed inside said second body, wherein said motherboard within said second body communicates the outside through said opening;
    a baffle, disposed on said bottom surface with said opening, wherein one side edge of the baffle is pivotally connected to the second body, and the baffle is able to rotate with respect to the second body;
    an elastic element with one end of the elastic element connected to the baffle and the other end of the elastic element connected to the second body;
    a pivotal rotation mechanism including:
        a first connecting piece, fixed to said bottom surface with said opening of the second body; and
        a second connecting piece, fixed to the baffle, wherein the first connecting piece and the second connecting piece are pivotally connected with each other via a shaft, such that the first connecting piece and the second connecting piece are able to rotate with respect to each other; and
    a drive mechanism, including:
        a pivot, having two ends respectively connected to the first body and the second body;
        a linkage, sleeved over the pivot; and
        a cam, sleeved over the linkage, and disposed corresponding to the position of the baffle;
    wherein the electronic device is arranged such that when the first body rotates with respect to the second body, the first body drives the pivot to rotate, the pivot drives the linkage to make the cam rotate, and the cam contacts and pushes the baffle and makes the baffle rotate with respect to the second body and expose part of the opening; wherein when the first body rotates with respect to the second body, the cam separates from the baffle, and the elastic element pull the baffle back for covering the opening; wherein the baffle further includes a stopper disposed on said baffle and corresponding to said second body; and when the baffle rotates with respect to the second body, the stopper withstands the second body, such that the baffle rotates in a limited range of angle, wherein said bottom surface with said opening of the second body further includes a plurality of pads, and the maximum distance between the baffle and the second body is shorter than the height of each of the pads.

2. The electronic device as claimed in claim 1, wherein the drive mechanism further includes:
    a first fixing board, fixed to the first body and having a first aperture;
    a second fixing board, fixed to the second body and having a second aperture; wherein two ends of the pivot respectively run through the first aperture and the second aperture.

3. The electronic device as claimed in claim 1, wherein the linkage further includes:
- a first linkage element, sleeved over the pivot;
- a second linkage element, wherein one end of the second linkage element is pivotally connected to the first linkage element; and
- a third linkage element, pivotally connected to the other end of the second linkage element and mutually sleeved over the cam.

4. The electronic device as claimed in claim 1, wherein the elastic element is a torsion spring.

5. The electronic device as claimed in claim 1, further comprising at least one electrical connection port disposed on the baffle, wherein the electrical connection port is electrically connected to the motherboard, and the electrical connection port is exposed through the opening with the movement of the baffle.

6. The electronic device as claimed in claim 1, wherein the baffle further includes a plurality of heat exhausting holes.

* * * * *